(12) United States Patent
Duan et al.

(10) Patent No.: US 8,443,247 B2
(45) Date of Patent: May 14, 2013

(54) METHODS AND SYSTEMS USING WINDOW START UPDATE FOR WIRELESS COMMUNICATION HARQ CONNECTION

(75) Inventors: Quanzhu Duan, San Diego, CA (US); Chun Woo Lee, San Diego, CA (US); Jong Ro Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 12/577,778

(22) Filed: Oct. 13, 2009

(65) Prior Publication Data

US 2010/0153809 A1 Jun. 17, 2010

Related U.S. Application Data

(60) Provisional application No. 61/122,338, filed on Dec. 12, 2008.

(51) Int. Cl.
 *G08C 25/02* (2006.01)
(52) U.S. Cl.
 USPC .......................................................... 714/748
(58) Field of Classification Search ................... 714/748
 See application file for complete search history.

(56) References Cited

U.S. PATENT DOCUMENTS

| | | | |
|---|---|---|---|
| 6,330,435 B1 | 12/2001 | Lazraq et al. | |
| 6,424,625 B1 | 7/2002 | Larsson et al. | |
| 6,473,399 B1 * | 10/2002 | Johansson et al. | 370/229 |
| 7,164,654 B2 * | 1/2007 | Hunzinger et al. | 370/230 |
| 7,502,385 B2 | 3/2009 | Wei et al. | |
| 7,525,908 B2 * | 4/2009 | Olsson et al. | 370/229 |
| 7,631,239 B2 * | 12/2009 | Yeo et al. | 714/748 |
| 8,036,101 B2 * | 10/2011 | Kim et al. | 370/216 |
| 8,060,023 B2 * | 11/2011 | Usuda et al. | 455/69 |
| 2002/0191544 A1 * | 12/2002 | Cheng et al. | 370/236 |
| 2003/0086403 A1 * | 5/2003 | Harris et al. | 370/338 |
| 2003/0147396 A1 * | 8/2003 | Jiang | 370/394 |
| 2008/0109693 A1 * | 5/2008 | Maas et al. | 714/748 |
| 2008/0298322 A1 * | 12/2008 | Chun et al. | 370/335 |
| 2009/0103478 A1 | 4/2009 | Sammour et al. | |
| 2009/0222705 A1 * | 9/2009 | Hekstra-Nowacka et al. | 714/748 |

FOREIGN PATENT DOCUMENTS

| | | |
|---|---|---|
| WO | WO2004042953 | 5/2004 |
| WO | WO2005064840 | 7/2005 |
| WO | WO2007050231 | 5/2007 |

OTHER PUBLICATIONS

International Search Report—PCT/US2009/067201, International Search Authority—European Patent Office—Jun. 7, 2010.
Written Opinion—PCT/US2009/067201—ISA/EPO—Jun. 7, 2010.
Taiwan Search Report—TW098142530—TIPO—Oct. 17, 2012.

* cited by examiner

*Primary Examiner* — Philip Guyton
(74) *Attorney, Agent, or Firm* — Tyler J. Overall

(57) ABSTRACT

Embodiments of the present disclosure allow a HARQ transmitter to provide a receiver an indication of the protocol data units (PDUs) that should not be expected because they are part of a data burst that has been retransmitted a maximum allowable number of times. The indication message may contain a maximum serial number contained in the data burst that has reached the maximum number of retransmissions, or the serial number of a first PDU in the next data burst.

24 Claims, 10 Drawing Sheets

| EXTENDED SUBHEADER TYPE | NAME | EXTENDED SUBHEADER BODY SIZE (BYTE) |
|---|---|---|
| 0 | SDU_SN EXTENDED SUBHEADER | 1 |
| 1 | DL SLEEP CONTROL EXTENDED SUBHEADER | 3 |
| 2 | FEEDBACK REQUEST EXTENDED SUBHEADER | 3 |
| 3 | SN REQUEST EXTENDED SUBHEADER | 1 |
| 4 | PDU SN(SHORT) EXTENDED SUBHEADER | 1 |
| 5 | PDU SN(LONG) EXTENDED SUBHEADER | 2 |
| 6 | PDU SN(SHORT) OF HARQ WINDOW START EXTENDED SUBHEADER | 2 |
| 7 | PDU SN(LONG) OF HARQ WINDOW START EXTENDED SUBHEADER | 4 |
| 8-127 | RESERVED | |

FIG. 10

METHODS AND SYSTEMS USING WINDOW START UPDATE FOR WIRELESS COMMUNICATION HARQ CONNECTION

CLAIM OF PRIORITY

This application claims the benefit of priority from U.S. Provisional Patent Application Ser. No. 61/122,338, entitled "Window Start Update for PDU SN Reordering Enabled HARQ Connection" and filed Dec. 12, 2008," which is assigned to the assignee of this application and is fully incorporated herein by reference for all purposes.

TECHNICAL FIELD

Certain embodiments of the present disclosure generally relate to wireless communications and, more particularly, to wireless communications utilizing retransmission schemes.

BACKGROUND

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

Hybrid Automatic Repeat-Request (HARQ) techniques allow for reliable data transmissions, requiring data bursts to be acknowledged by a receiver or they will be retransmitted. Unfortunately, if a data burst includes protocol data units (PDUs) that have not been successfully decoded, the receiver may continue to wait for the PDUs even if the data burst containing them has been retransmitted a maximum allowable number of times.

SUMMARY

Certain embodiments provide a method for wireless communications with Hybrid Automatic Repeat-Request (HARQ) transmissions. The method generally includes receiving a HARQ data burst containing one or more protocol data units (PDUs), each having a sequence number (SN), wherein at least one of the PDUs is not received successfully, such that a HARQ ACK message is not sent for the HARQ data burst prompting a retransmission of the HARQ data burst, and receiving, after a maximum number of HARQ retransmissions has been reached for the data burst, a message with information indicating sequence numbers for PDUs that should not be expected because the maximum number of HARQ retransmissions has been reached.

Certain embodiments provide a method for wireless communications with HARQ transmissions. The method generally includes transmitting a HARQ data burst containing one or more protocol data units (PDUs), each having a sequence number (SN), retransmitting the HARQ data burst if the data burst was received in error, and transmitting, after a maximum number of HARQ retransmissions has been reached for the data burst, a message with information indicating sequence numbers for PDUs that are received in error and should not be expected because the maximum number of HARQ retransmissions has been reached.

Certain embodiments provide an apparatus for wireless communications with HARQ transmissions. The apparatus generally includes means for receiving a HARQ data burst containing one or more PDUs, each having a sequence number (SN), wherein at least one of the PDUs is not received successfully, such that a HARQ ACK message is not sent for the HARQ data burst prompting a retransmission of the HARQ data burst, and means for receiving, after a maximum number of HARQ retransmissions has been reached for the data burst, a message with information indicating sequence numbers for PDUs that should not be expected because the maximum number of HARQ retransmissions has been reached.

Certain embodiments provide an apparatus for wireless communications with HARQ transmissions. The apparatus generally includes means for transmitting a HARQ data burst containing one or more PDUs, each having a sequence number (SN), means for retransmitting the HARQ data burst if the data burst was received in error, and means for transmitting, after a maximum number of HARQ retransmissions has been reached for the data burst, a message with information indicating sequence numbers for PDUs that are received in error and should not be expected because the maximum number of HARQ retransmissions has been reached.

Certain embodiments provide an apparatus for wireless communications with HARQ transmissions. The apparatus generally includes logic for receiving a HARQ data burst containing one or more PDUs, each having a sequence number (SN), wherein at least one of the PDUs is not received successfully, such that a HARQ ACK message is not sent for the HARQ data burst prompting a retransmission of the HARQ data burst, and logic for receiving, after a maximum number of HARQ retransmissions has been reached for the data burst, a message with information indicating sequence numbers for PDUs that should not be expected because the maximum number of HARQ retransmissions has been reached.

Certain embodiments provide an apparatus for wireless communications with HARQ transmissions. The apparatus generally includes logic for transmitting a HARQ data burst containing one or more PDUs, each having a sequence number (SN), logic for retransmitting the HARQ data burst if the data burst was received in error, and logic for transmitting, after a maximum number of HARQ retransmissions has been reached for the data burst, a message with information indicating sequence numbers for PDUs that are received in error and should not be expected because the maximum number of HARQ retransmissions has been reached.

Certain embodiments of the present disclosure provide a computer-program product for wireless communications with HARQ transmissions, comprising a computer readable medium having instructions stored thereon, the instructions being executable by one or more processors. The instructions generally include instructions for receiving a HARQ data burst containing one or more PDUs, each having a sequence number (SN), wherein at least one of the PDUs is not received successfully, such that a HARQ ACK message is not sent for the HARQ data burst prompting a retransmission of the HARQ data burst, and instructions for receiving, after a maximum number of HARQ retransmissions has been reached for the data burst, a message with information indicating sequence numbers for PDUs that should not be expected because the maximum number of HARQ retransmissions has been reached.

Certain embodiments of the present disclosure provide a computer-program product for wireless communications with HARQ transmissions, comprising a computer readable medium having instructions stored thereon, the instructions being executable by one or more processors. The instructions generally include instructions for transmitting a HARQ data burst containing one or more PDUs, each having a sequence number (SN), instructions for retransmitting the HARQ data burst if the data burst was received in error, and instructions for transmitting, after a maximum number of HARQ retransmissions has been reached for the data burst, a message with information indicating sequence numbers for PDUs that are received in error and should not be expected because the maximum number of HARQ retransmissions has been reached.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 10 shows a table containing different types of extended subheaders for downlink (DL) according to the IEEE 802.16 standard in addition to the proposed extended subheader types for HARQ window start, in accordance with certain embodiments of the present disclosure.

DETAILED DESCRIPTION

Figure 1:
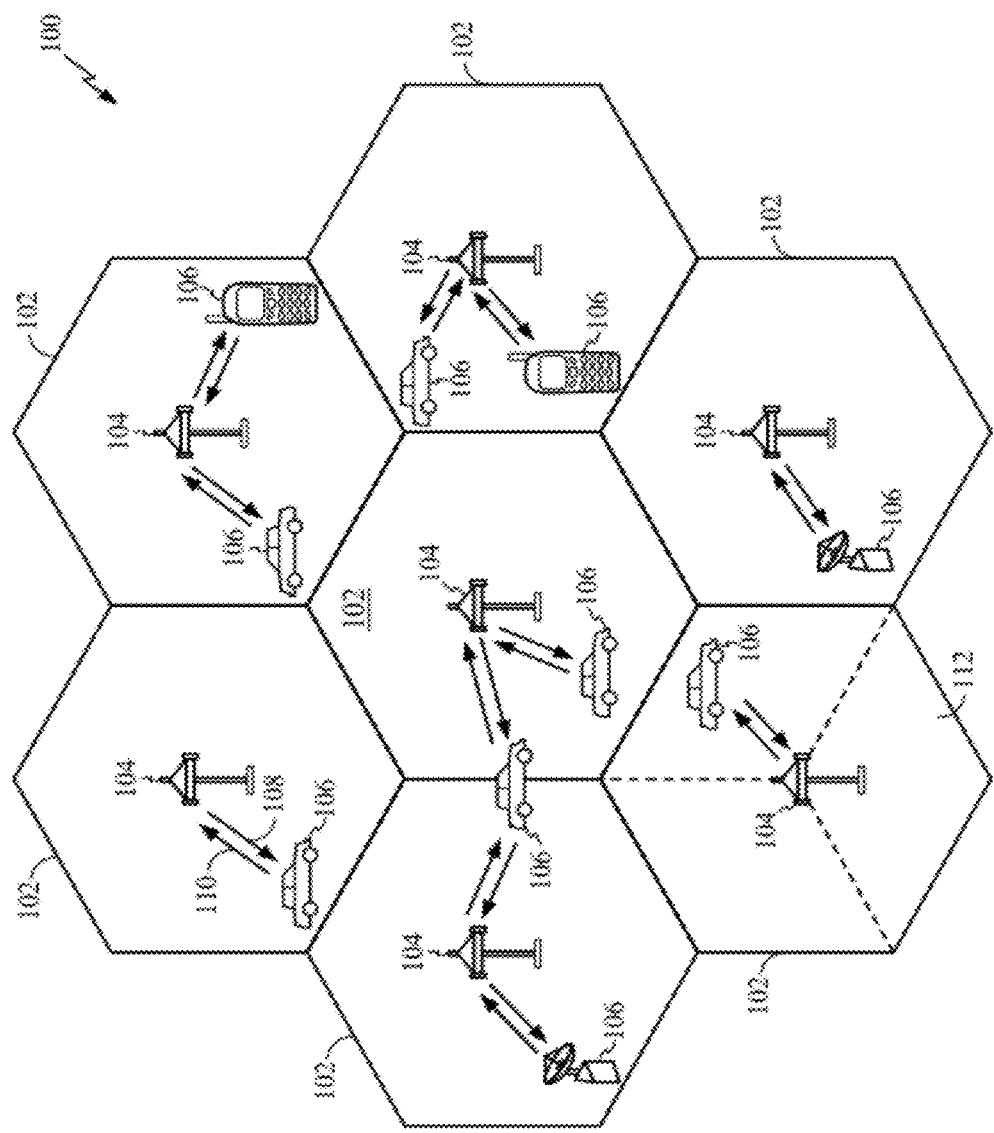
FIG. 1 illustrates an example wireless communication system, in accordance with certain embodiments of the present disclosure.

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

WiMAX is one example of a communication system based on an orthogonal multiplexing scheme. As noted above, there are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Exemplary Wireless Communication System

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
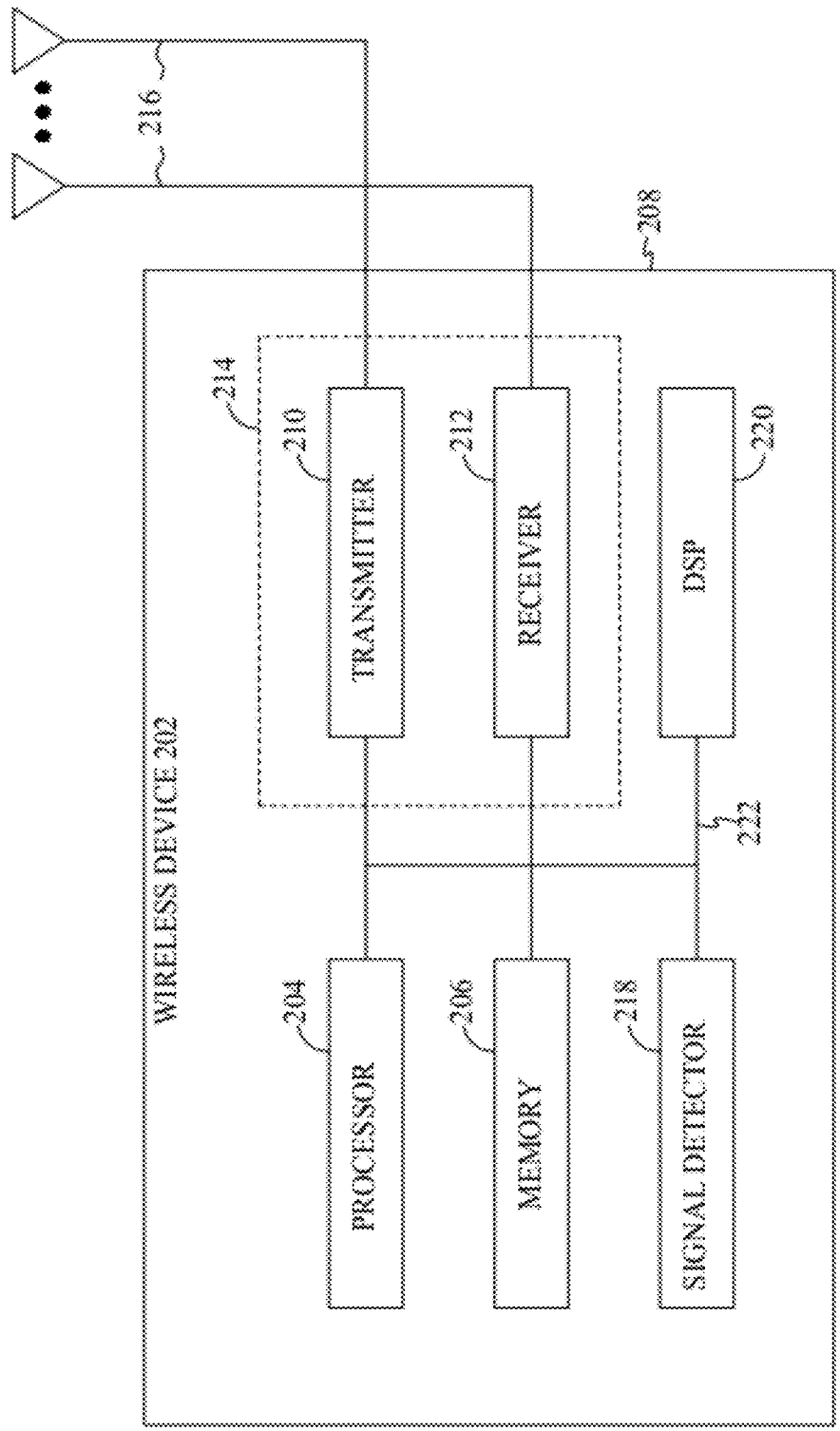
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
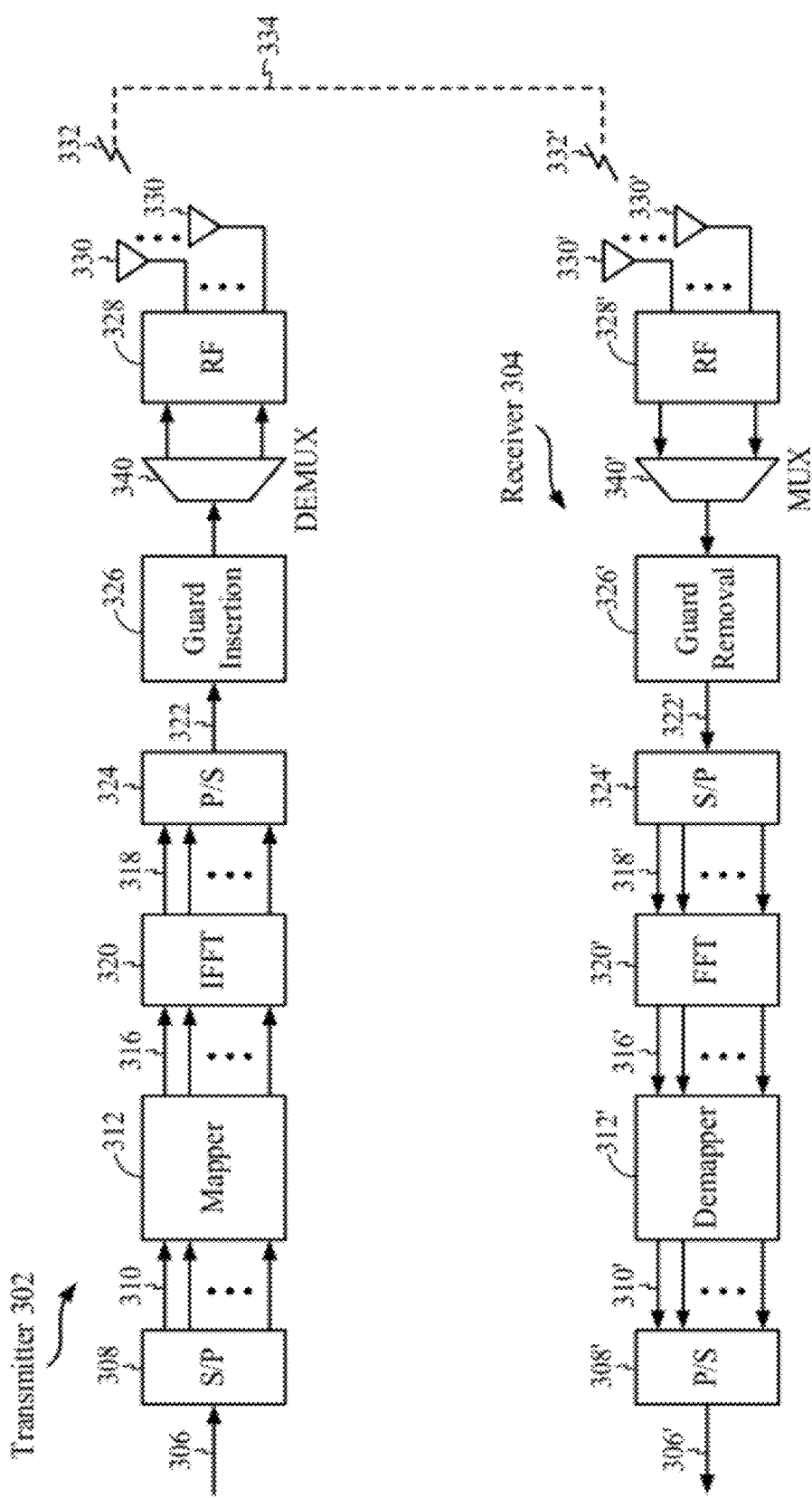
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Fast Window Start Update

Embodiments of the present disclosure provide methods that may prevent (or at least reduce) waiting time of a receiver in a hybrid automatic repeat request (HARQ) connection that employs Protocol Data Unit (PDU) Sequence Number (SN) reordering. The receiver in a PDU SN reordering enabled connection may still expect to receive a retransmission of a data burst, if some of the PDUs inside the data burst are still in error, even after a maximum number of retransmissions had been reached for the data burst. The receiver may wait to receive all of the PDUs before reordering and processing the received PDUs. In other words, the receiver may need to be designed to have enough memory to accommodate the incomplete PDUs for uncertain period of time because there is no restriction on the retransmission time.

Figure 4:
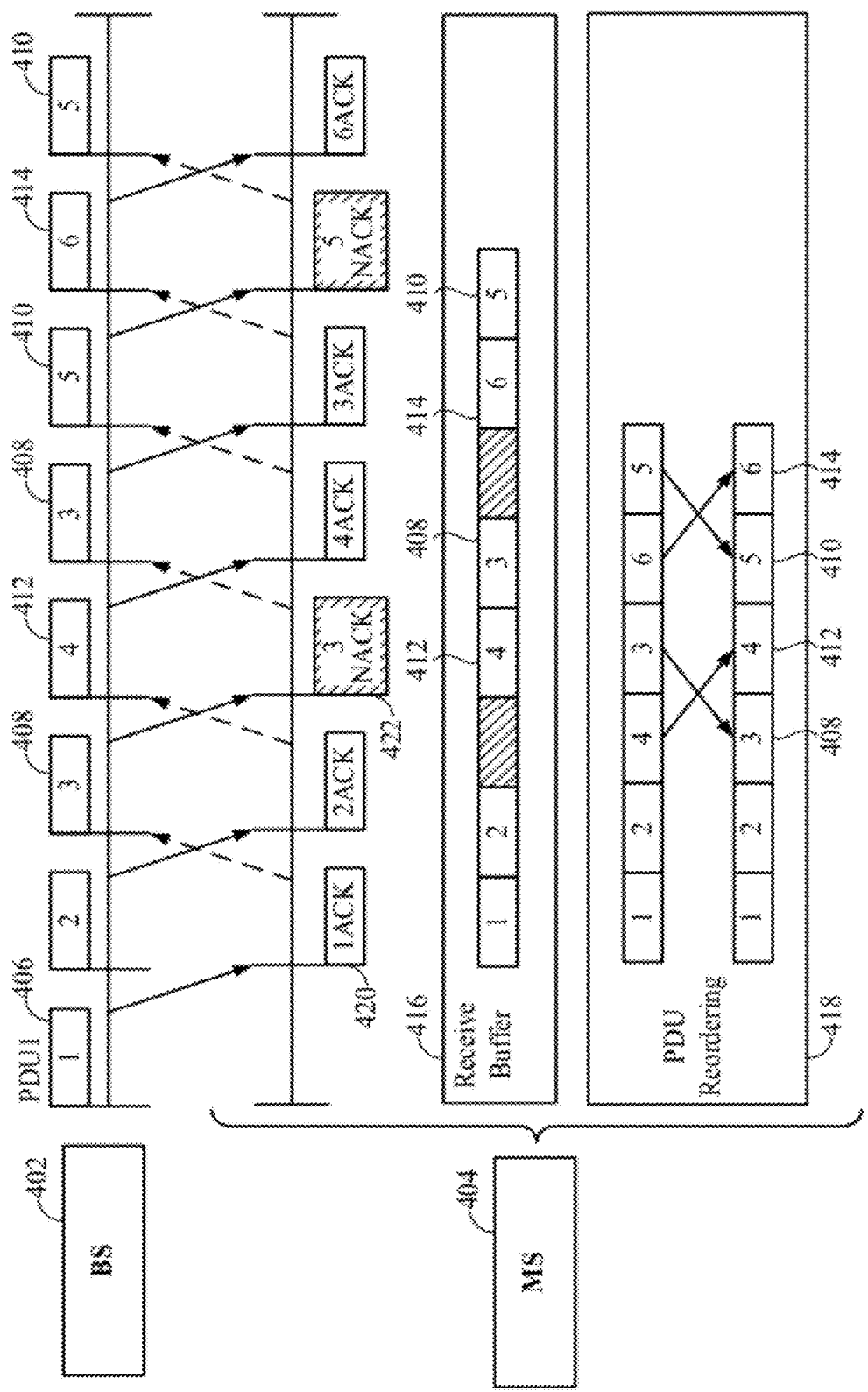
FIG. 4 illustrates an example of protocol data unit (PDU) reordering in a PDU serial number (SN) reordering enabled connection between a base station and a mobile station.

FIG. 4 illustrates an example of reordering PDUs in a PDU SN reordering-enabled connection between a base station and a mobile station. As illustrated, a base station (BS) 402 may send a plurality of PDUs, such as $PDU_1$ 406 to $PDU_6$ 414 to a mobile station (MS) 404. Before transmission, the base station may assign serial numbers to the PDUs. The serial numbers may show the original order of the PDUs at the base station. The mobile station may re-arrange the PDUs based on their serial numbers after receiving the PDUs.

In a HARQ connection, the order in which the PDUs are received may not necessarily be the same as the order of the PDUs at the transmitter, since some of the PDUs may be received in error and require retransmission.

The mobile station sends an acknowledgement (ACK) message 420 to the BS if it receives a PDU correctly. In FIG. 4, $PDU_1$ 406, $PDU_2$, $PDU_4$ 412 and $PDU_6$ 414 are received correctly after only one transmission, therefore, ACK messages are transmitted by the mobile station for these PDUs. However, $PDU_3$ 408 and $PDU_5$ 410 are not received correctly in the first transmission. The mobile station sends negative acknowledgements (NACK) 422 to the base station and asks for retransmission of $PDU_3$ and $PDU_5$. The $PDU_3$ 408 and $PDU_5$ 410 are received correctly in the second transmission.

As illustrated in the receive buffer 416, the PDUs are not received in their correct order (e.g., based on their serial number). Therefore, the PDUs need to be re-arranged at the receiver (e.g., 1 through 6 in the example in FIG. 4), before being processed. The PDU reordering block 418, sorts the received PDUs based on the serial number associated with each PDU, and stores them in a second buffer in an increasing order. For example, the reordering block switches the position of $PDU_3$ 408 and $PDU_4$ 412 to put them in the correct order.

In FIG. 4, for simplicity, each HARQ data burst transmitted by the BS is shown to contain only one PDU. However, in general, a HARQ data burst may contain one or more PDUs. In addition, in FIG. 4, the transmitter is shown to be the base station and the receiver is shown to be the mobile station. However, a similar procedure may happen if the transmitter is the mobile station and the receiver is the base station.

In a PDU SN reordering enabled connection, when maximum number of retransmissions has been reached for a data burst, the receiver may still be waiting to receive the PDUs that were previously in error, before reordering and processing the received PDUs.

Figure 5:
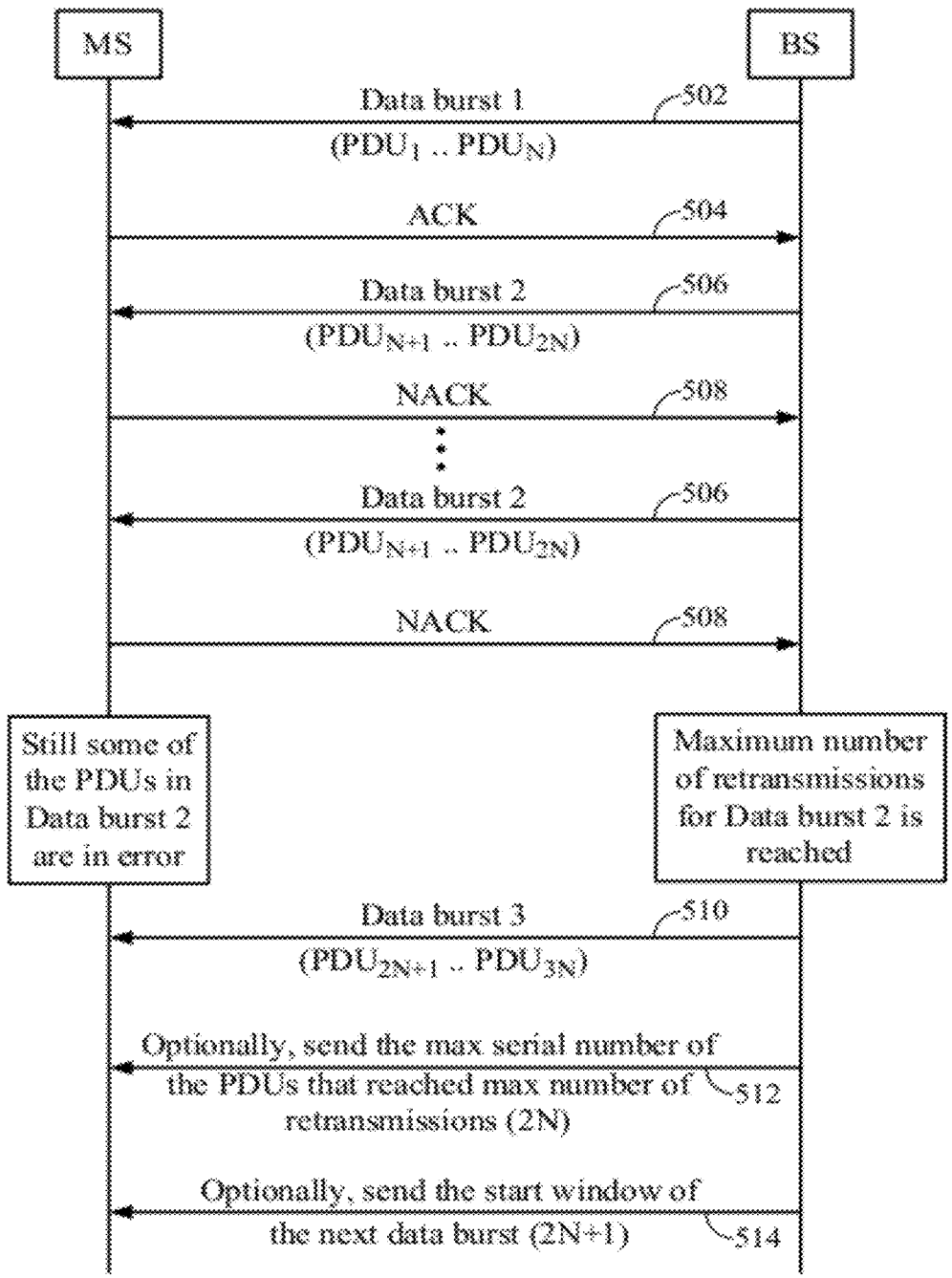
FIG. 5 illustrates an example hybrid automatic repeat request (HARQ) communication between a base station and a mobile station, in accordance with certain embodiments of the present disclosure.

FIG. 5 illustrates an example HARQ communication between a base station and a mobile station, in accordance with certain embodiments of the present disclosure. The base station may transmit the data burst 1 502 to the mobile station. The data burst 1 may contain a plurality of PDUs ($PDU_1$ through $PDU_N$). The MS receives the data burst 1 correctly and sends an acknowledgment message 504 to the BS. The BS sends the next data burst (e.g., data burst 2 506) to the MS. The MS receives at least one of the PDUs contained in the data burst 2 ($PDU_{N+1}$ to $PDU_{2N}$) in error, therefore, the MS asks for a retransmission by sending a NACK message 508 to the BS.

Even after several re-transmission of the data burst 2 506, the MS may still send a NACK message and wait to receive the data burst 2 again. However, if the transmitter reaches the maximum number of re-transmissions for data burst 2, the transmitter may stop retransmission of data burst 2 and transmit data burst 3 510, even if the MS is still waiting to receive the data burst 2.

When the transmitter detects that the maximum number of retransmissions has been reached for a data burst, the transmitter may take action to notify the receiver that no further transmission for the PDUs contained in the data burst should be expected. The notification sent by the transmitter may take various forms.

For example, according to certain embodiments of the present disclosure, a discard message 512 may be used to notify the receiver (e.g., the MS) that the maximum number of retransmissions for a data burst (e.g., data burst 2 506) has been reached. The discard message 512 sent by the transmitter (e.g., the BS) may include a Maximum Sequence Number (e.g., 2N), indicating to the receiver that PDUs with Sequence Numbers equal to or less than the Maximum Sequence Number that have not yet been successfully received should not be expected. Thus, the receiver should not continue to wait for those PDUs and may proceed to other processing operations.

Figure 6:
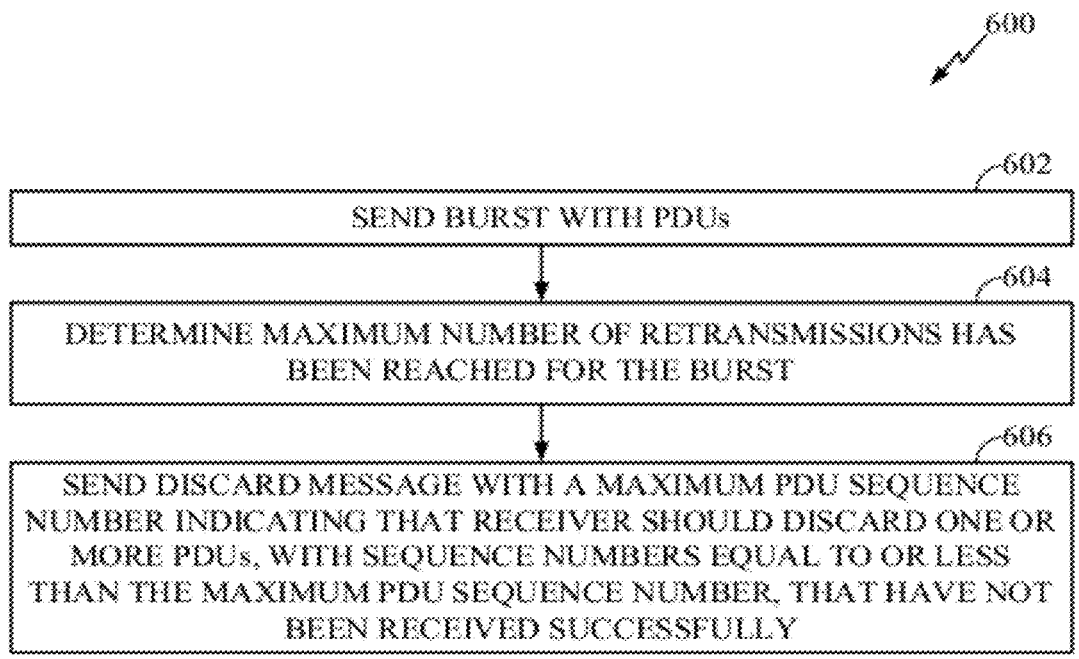
FIG. 6 illustrates example transmitter-side operations utilizing a discard message to notify a receiver that the maximum number of retransmissions for a data burst has been reached, according to certain embodiments of the present disclosure.
Figure 6A:
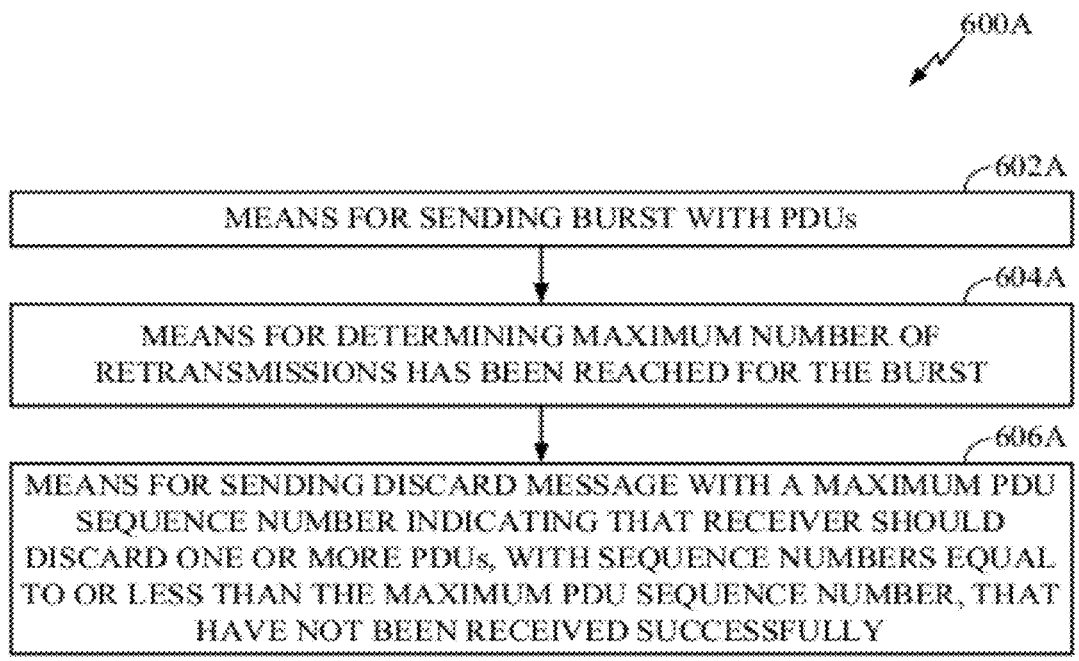
FIG. 6A is a block diagram of means corresponding to the operations of FIG. 6.

FIG. 6 illustrates example transmitter-side operations 600 utilizing a discard message to notify a receiver that the maximum number of retransmissions for a data burst has been reached, according to certain embodiments of the present disclosure. At 602, the transmitter sends a data burst with PDUs, each of which having a sequence number. Due to transmission errors, one or more PDUs may not be successfully received. Even though an error check (e.g., cyclic redundancy check (CRC)) for the entire data burst may fail, the receiver may be able to successfully decode some PDUs, as they have separate checksums. Regardless, the receiver will not acknowledge the data burst (e.g., may send a negative acknowledgement requesting a retransmission). In such a case, the transmitter may retransmit the data burst in response to the request from the receiver.

However, for connections with HARQ, there is a limit on the number of retransmissions of a data burst. At 604, the transmitter determines that maximum number of retransmission has been reached for the data burst.

At 606, the transmitter sends a discard message containing a Maximum PDU Sequence number (SN) to the receiver. According to certain embodiments of the present disclosure, the discard message may contain a Maximum PDU Sequence Number and a Connection Identifier (CID). The discard message indicates that the receiver should discard (and not continue waiting for) one or more unsuccessfully received PDUs with sequence numbers equal to or less than the Maximum Sequence Number.

Figure 7:
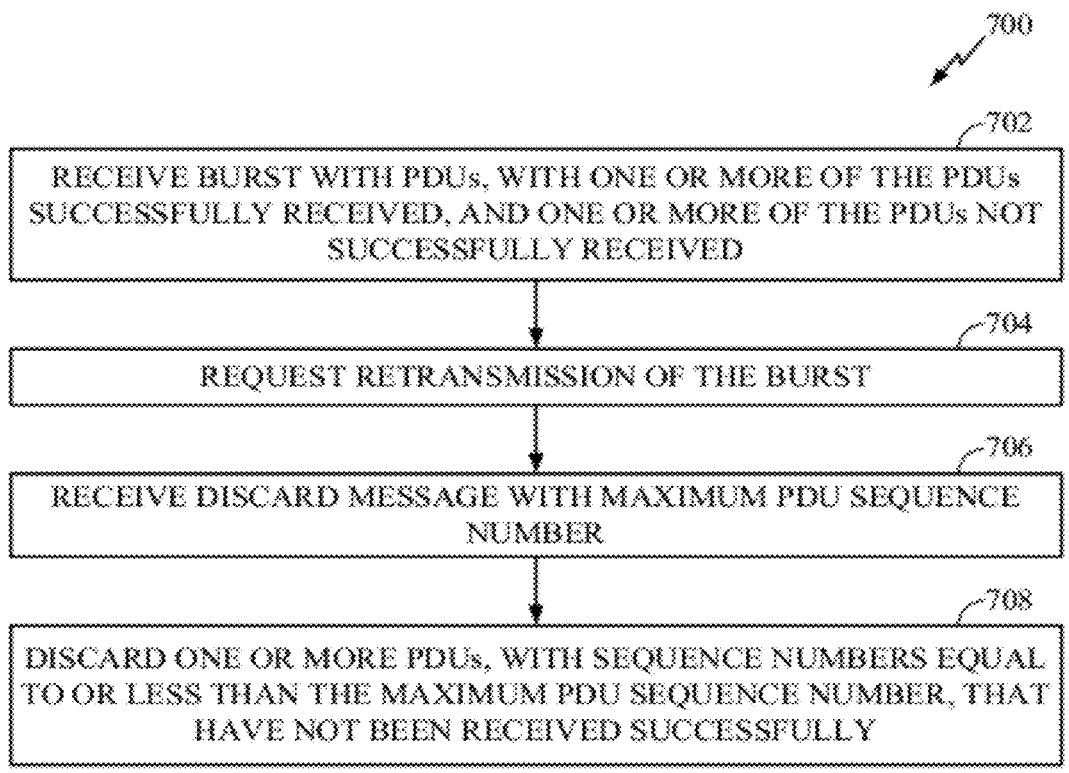
FIG. 7 illustrates receiver-side operations corresponding to the operations of FIG. 6, in accordance with certain embodiments of the present disclosure.
Figure 7A:
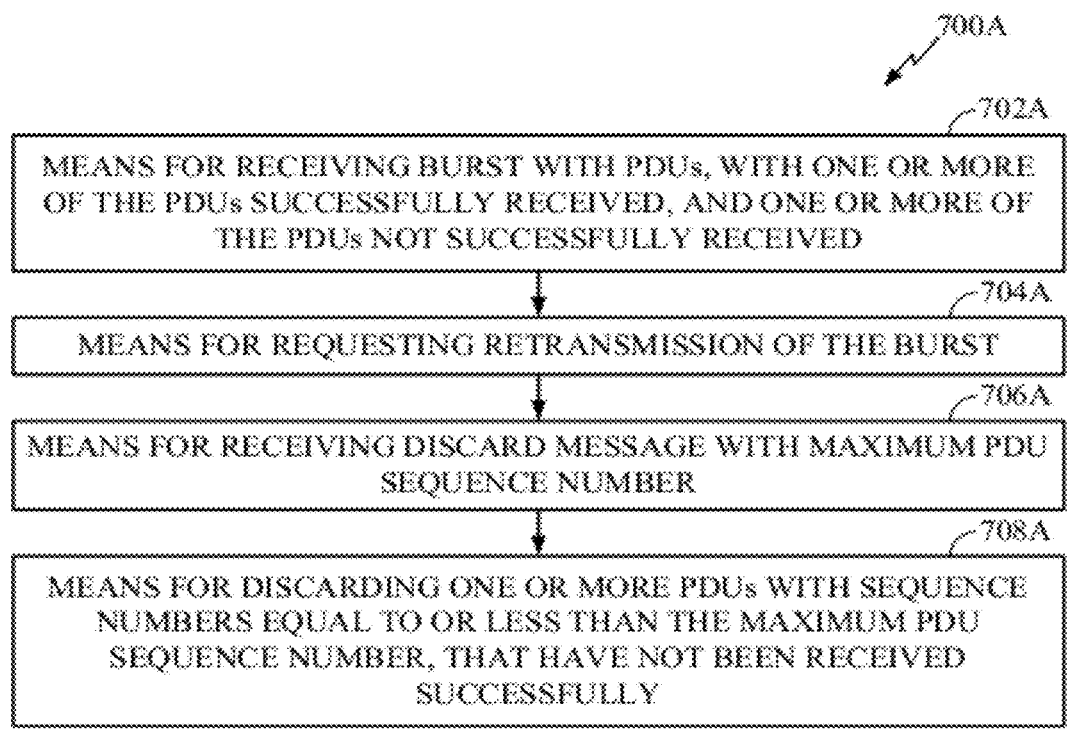
FIG. 7A is a block diagram of means corresponding to the operations of FIG. 7.

FIG. 7 shows receiver-side operations 700 corresponding to the operations of FIG. 6. At 702, the receiver receives a data burst. The data burst may contain one or more PDUs. Some PDUs are successfully received, whereas, due to transmission errors, other PDUs are not successfully received.

At 704, the receiver requests retransmission of the data burst in response to PDUs that were not received successfully. For certain embodiments, the receiver may simply fail to send a positive acknowledgement.

At 706, the receiver receives a discard message from the transmitter. As noted above, the discard message may include a Maximum Sequence Number and may cause the receiver to stop waiting for unsuccessfully received PDUs to be retransmitted, in the situation where the maximum number of retransmissions has been reached.

At 708, the receiver may respond to the discard message by discarding one or more of the unsuccessfully received PDUs with Sequence Numbers equal to or less than the Maximum PDU Sequence Number, or by simply ceasing to wait for the unsuccessfully received PDUs and proceeding to other operations, such as reordering the remaining PDUs and delivering the reordered PDUs to a higher layer.

According to certain embodiments, a transmitter may notify a receiver that the maximum number or retransmissions of a data burst has been reached by sending a message (e.g., 514 in FIG. 5) containing a New Window Start value (e.g., the first PDU number) of the next data burst.

Figure 8:
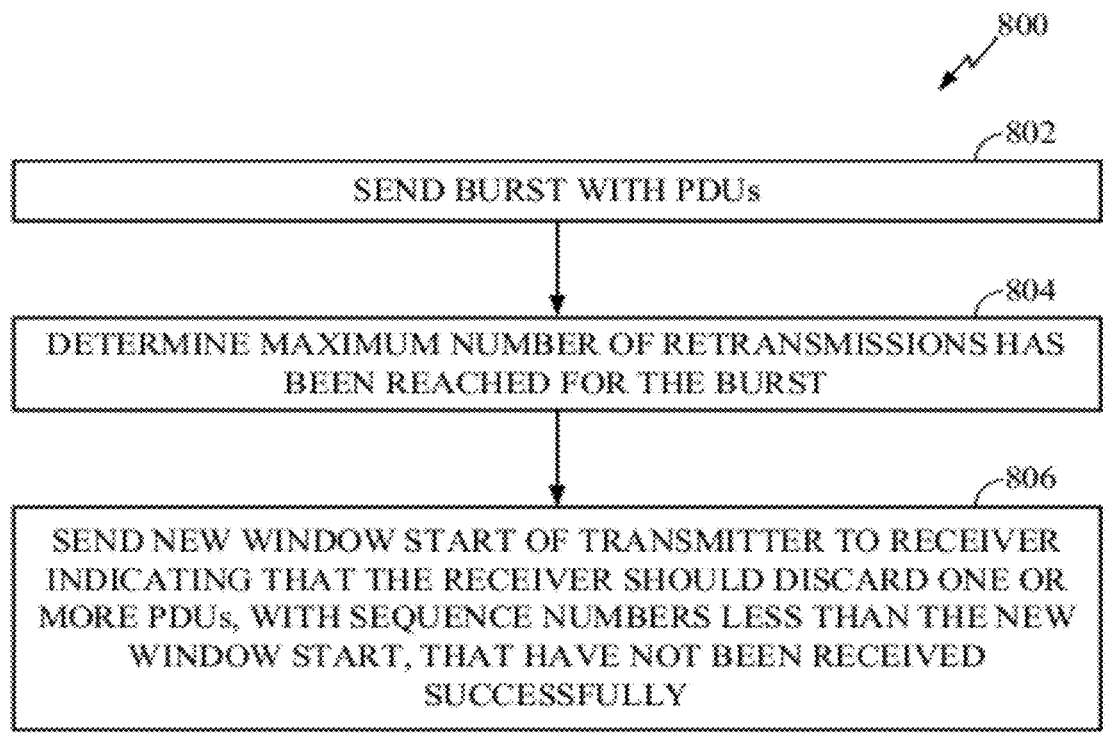
FIG. 8 illustrates an embodiment of transmitter-side operations according to a second method for notifying the receiver that the maximum number of retransmissions of a data burst has been reached, in accordance with certain embodiments of the present disclosure.
Figure 8A:
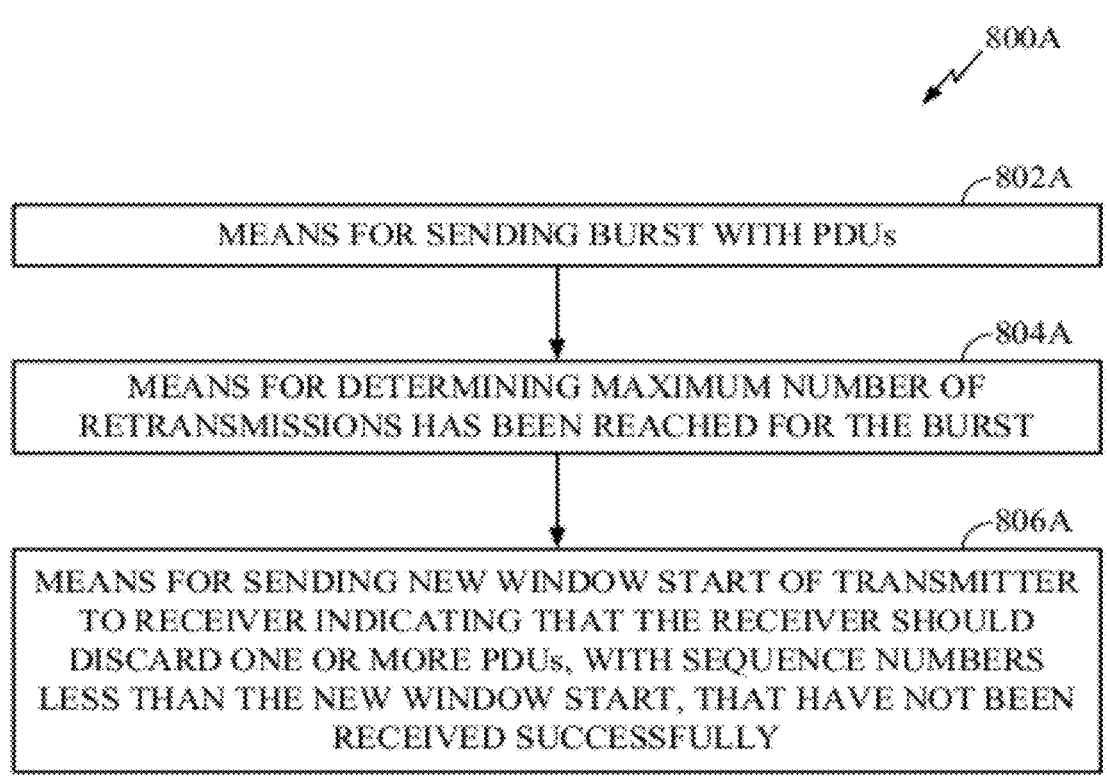
FIG. 8A is a block diagram of means corresponding to the operations of FIG. 8.

FIG. 8 illustrates transmitter-side operations 800 according to a second method for notifying the receiver that the maximum number of retransmissions of a data burst has been reached by utilizing a New Window Start message, in accordance with certain embodiments of the present disclosure. At 802, the transmitter sends a data burst containing one or more PDUs. Transmission errors may affect one or more PDUs which, as a result may not be received successfully. The transmitter may retransmit the data burst if it receives a NACK message from the receiver.

At 804, the transmitter determines that maximum number of retransmissions has been reached for the data burst.

At 806, the transmitter sends a New Window Start to the receiver. The New Window Start may indicate a Sequence Number corresponding to the first PDU that the transmitter may intend to transmit as part of the next data burst. According to the operations 800, this New Window Start may indicate that the receiver should discard one or more unsuccessfully received PDUs, with Sequence Numbers less than the New Window Start.

Figure 9:
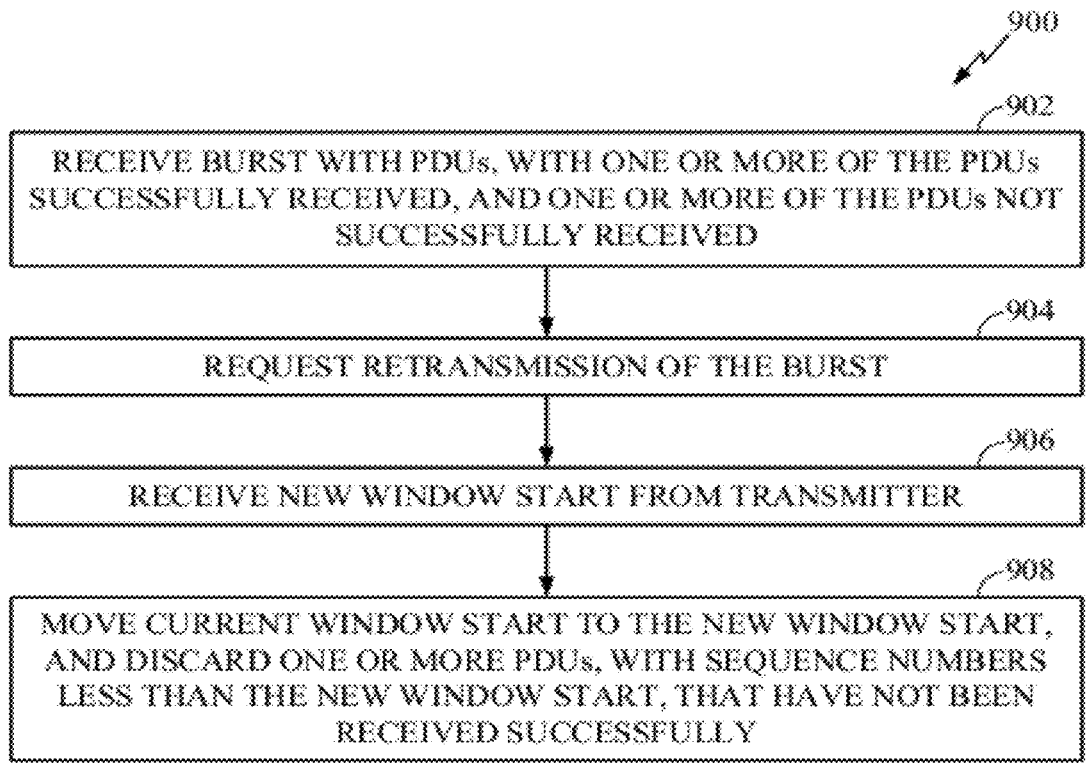
FIG. 9 illustrates receiver-side operations corresponding to the transmitter-side operations in FIG. 8, in accordance with certain embodiments of the present disclosure.
Figure 9A:
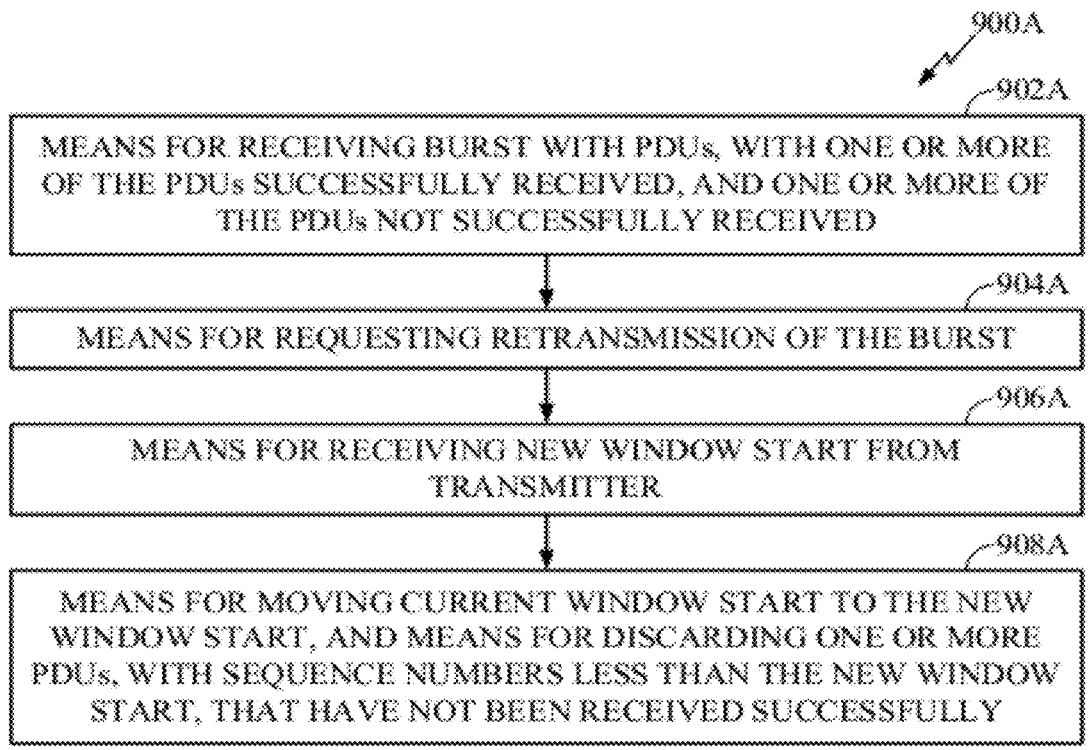
FIG. 9A is a block diagram of means corresponding to the operations of FIG. 9.

FIG. 9 illustrates receiver-side operations 700 corresponding to the operations in FIG. 8. At 902, the receiver receives a data burst. The data burst contains one or more PDUs. Some PDUs are successfully received, whereas, due to transmission errors, other PDUs are not successfully received. At 904, the receiver requests that the data burst be retransmitted if PDUs are received unsuccessfully.

At 906, the receiver receives a New Window Start from the transmitter. The New Window Start may indicate that a new data burst is about to be transmitted beginning with a specified Sequence Number. Thus, at 908, the receiver may respond by moving a current window start to the New Window Start. Also, the receiver may discard PDUs whose sequence numbers are less than the New Window Start, which have not been received successfully. The receiver may reorder, process and deliver the remaining PDUs to a higher layer, e.g., Convergence Sublayer (media access control (MAC)-CS).

Different techniques may be used for sending the New Window Start to the receiver. For certain embodiments, an Extended Subheader of MAC PDU may be used to carry a New Window Start to the receiver.

For example, FIG. 10 shows different types of extended subheaders for Downlink (DL) MAC PDU according to IEEE 802.16 in addition to the proposed extended subheader types. According to certain embodiments, one or more extended subheader types (e.g., 6 and 7 as shown) may be added to the list of extended subheaders of the IEEE 802.16. In the illustrated example, Type 6 is proposed for PDU SN (short) of HARQ window start extended subheader and Type 7 is proposed for PDU SN (long) of HARQ window start extended subheader. However, any of the reserved subheader types may be used for the PDU SN HARQ window start extended subheaders.

In the above example, when the receiver receives extended subheaders of a MAC PDU, the receiver may extract information about the new HARQ window start from the types 6 and 7 extended subheaders. The receiver may then compare new window start which may be the serial number of the first PDU of the next data burst with the serial numbers of the PDUs that are received in error. If the sequence number in the new window start is higher than the sequence number of the unsuccessfully received PDUs, the receiver may discard the PDUs that are received in error and processes only the PDUs that are received correctly.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 600, 700, 800, and 900 illustrated in FIGS. 6, 7, 8, and 9 all correspond to means-plus-function blocks 600A, 700A, 800A, and 900A illustrated in FIGS. 6A, 7A, 8A, and 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for wireless communications with lower level Hybrid Automatic Repeat-Request (HARQ) transmissions, comprising:
    receiving a lower level HARQ data burst including at least one protocol data unit (PDU), each PDU having a sequence number;
    transmitting a HARQ negative acknowledge (NAK) message for prompting a retransmission of the lower level HARQ data burst when at least one PDU is not successfully received; and
    receiving, after a maximum number of lower level HARQ retransmissions has been reached for the data burst including the at least one PDU that was not successfully received, a PDU header indicating a sequence number for the at least one PDU that should not be expected because the maximum number of lower level HARQ retransmissions has been reached.

2. The method of claim 1, wherein:
    the PDU header comprises a maximum sequence number indicating the at least one PDU with the sequence number equal to or less than the maximum sequence number should not be expected.

3. The method of claim 1, wherein:
    the PDU header comprises a new window start value of a next lower level HARQ data burst, indicating the at least one PDU with the sequence number less than the new window start value should not be expected.

4. A method for wireless communications with lower level Hybrid Automatic Repeat-Request (HARQ) transmissions, comprising:
    transmitting a lower level HARQ data burst including at least one protocol data unit (PDU), each PDU having a sequence number;
    retransmitting the lower level HARQ data burst when the data burst was received in error; and
    transmitting, after a maximum number of lower level HARQ retransmissions has been reached for the data burst including the at least one PDU that was not successfully received, a PDU header indicating a sequence number for the at least one PDU that was received in error and should not be expected because the maximum number of HARQ retransmissions has been reached.

5. The method of claim 4, wherein:
    the PDU header comprises a maximum sequence number indicating the at least one PDU with the sequence number equal to or less than the maximum sequence number should not be expected.

6. The method of claim 4, wherein:
    the PDU header comprises a new window start value of a next lower level HARQ data burst, indicating the at least one PDU with the sequence number less than the new window start value should not be expected.

7. An apparatus for wireless communications with lower level Hybrid Automatic Repeat-Request (HARQ) transmissions, comprising:
means for receiving a HARQ data burst including at least one protocol data units (PDU), each PDU having a sequence number;
means for transmitting a HARQ negative acknowledge (NAK) message for prompting a retransmission of the lower level HARQ data burst when at least one PDU is not successfully received; and
means for receiving, after a maximum number of lower level HARQ retransmissions has been reached for the data burst including the at least one PDU that was not successfully received, a PDU header indicating a sequence number for the at least one PDU that should not be expected because the maximum number of lower level HARQ retransmissions has been reached.

8. The apparatus of claim 7, wherein:
the PDU header comprises a maximum sequence number indicating the at least one PDU with the sequence number equal to or less than the maximum sequence number should not be expected.

9. The apparatus of claim 7, wherein:
the PDU header comprises a new window start value of a next lower level HARQ data burst, indicating the at least one PDU with the sequence number less than the new window start value should not be expected.

10. An apparatus for wireless communications with lower level Hybrid Automatic Repeat-Request (HARQ) transmissions, comprising:
means for transmitting a lower level HARQ data burst including at least one protocol data unit (PDU), each PDU having a sequence number;
means for retransmitting the lower level HARQ data burst when the data burst was received in error; and
means for transmitting, after a maximum number of lower level HARQ retransmissions has been reached for the data burst including the at least one PDU that was not successfully received, a PDU header indicating a sequence number for the at least one PDU that are was received in error and should not be expected because the maximum number of lower level HARQ retransmissions has been reached.

11. The apparatus of claim 10, wherein:
the PDU header comprises a maximum sequence number indicating the at least one PDU with the sequence number equal to or less than the maximum sequence number should not be expected.

12. The apparatus of claim 10, wherein:
the PDU header comprises a new window start value of a next lower level HARQ data burst, indicating the at least one PDU with the sequence number less than the new window start value should not be expected.

13. An apparatus for wireless communications with lower level Hybrid Automatic Repeat-Request (HARQ) transmissions, comprising:
a receiver configured to receive a lower level HARQ data burst including least one protocol data unit (PDU), each PDU having a sequence number;
a transmitter configured to transmit a HARQ negative acknowledge (NAK) message for prompting a retransmission of the lower level HARQ data burst when at least one PDU is not successfully received, wherein the receiver is further configured to:
receive, after a maximum number of lower level HARQ retransmissions has been reached for the data burst including the at least one PDU that was not successfully received, a PDU header indicating a sequence number for the at least one PDU that should not be expected because the maximum number of lower level HARQ retransmissions has been reached.

14. The apparatus of claim 13, wherein:
the message PDU header comprises a maximum sequence number indicating the at least one PDU with the sequence number equal to or less than the maximum sequence number should not be expected.

15. The apparatus of claim 13, wherein:
the PDU header comprises a new window start value of a next lower level HARQ data burst, indicating the at least one PDU with the sequence number less than the new window start value should not be expected.

16. An apparatus for wireless communications with lower level Hybrid Automatic Repeat-Request (HARQ) transmissions, comprising:
a transmitter configured to:
transmit a lower level HARQ data burst including at least one protocol data unit (PDU), each PDU having a sequence number;
retransmit the lower level HARQ data burst when the data burst was received in error; and
transmit, after a maximum number of lower level HARQ retransmissions has been reached for the data burst including the at least one PDU that was not successfully received, a PDU header indicating a sequence number for the at least one PDU that was received in error and should not be expected because the maximum number of lower level HARQ retransmissions has been reached.

17. The apparatus of claim 16, wherein:
the PDU header comprises a maximum sequence number indicating the at least one PDU with the sequence number equal to or less than the maximum sequence number should not be expected.

18. The apparatus of claim 16, wherein:
the PDU header comprises a new window start value of a next lower level HARQ data burst, indicating the at least one PDU with the sequence number less than the new window start value should not be expected.

19. A computer-program product for wireless communications with lower level Hybrid Automatic Repeat-Request (HARQ) transmissions, comprising a non-transitory a computer readable storage medium having instructions stored thereon, the instructions being executable by one or more processors and the instructions comprising:
instructions for receiving a lower level HARQ data burst including at least one protocol data unit (PDU), each PDU having a sequence number;
instructions for transmitting a HARQ negative acknowledge (NAK) message for prompting a retransmission of the lower level HARQ data burst when at least one PDU is not successfully received; and
instructions for receiving, after a maximum number of lower level HARQ retransmissions has been reached for the data burst including the at least one PDU that was not successfully received; a PDU header indicating a sequence number for the at least one PDU that should not be expected because the maximum number of lower level HARQ retransmissions has been reached.

20. The computer-program product of claim 19, wherein:
the PDU header comprises a maximum sequence number indicating the at least one PDU with the sequence number equal to or less than the maximum sequence number should not be expected.

21. The computer-program product of claim 19, wherein:
the PDU header comprises a new window start value of a next lower level HARQ data burst, indicating the at least one PDU with the sequence number less than the new window start value should not be expected.

22. A computer-program product for wireless communications with lower level Hybrid Automatic Repeat-Request (HARQ) transmissions, comprising a non-transitory computer readable storage medium having instructions stored thereon, the instructions being executable by one or more processors and the instructions comprising:
instructions for transmitting a lower level HARQ data burst including at least one protocol data unit (PDU), each PDU having a sequence number;
instructions for retransmitting the lower level HARQ data burst when the data burst was received in error; and
instructions for transmitting, after a maximum number of lower level HARQ retransmissions has been reached for the data burst including the at least one PDU that was not successfully received, a PDU header indicating a sequence number for the at least one PDU that was received in error and should not be expected because the maximum number of lower level HARQ retransmissions has been reached.

23. The computer-program product of claim 22, wherein;
the PDU header comprises a maximum sequence number indicating the at least one PDU with the sequence number equal to or less than the maximum sequence number should not be expected.

24. The computer-program product of claim 22, wherein:
the PDU header comprises a new window start value of a next lower level HARQ data burst, indicating the at least one PDU with the sequence number less than the new window start value should not be expected.

* * * * *